(12) United States Patent
Tsotsis

(10) Patent No.: US 11,407,199 B2
(45) Date of Patent: Aug. 9, 2022

(54) METAL-COATED FABRICS FOR FIBER-METAL LAMINATES

(75) Inventor: Thomas K. Tsotsis, Orange, CA (US)

(73) Assignee: THE BOEING COMPANY, Chicago, IL (US)

( * ) Notice: Subject to any disclaimer, the term of this patent is extended or adjusted under 35 U.S.C. 154(b) by 1610 days.

(21) Appl. No.: 12/424,021

(22) Filed: Apr. 15, 2009

(65) Prior Publication Data

US 2010/0264266 A1 Oct. 21, 2010

(51) Int. Cl.
*B32B 5/26* (2006.01)
*D06M 11/83* (2006.01)
(Continued)

(52) U.S. Cl.
CPC ............ *B32B 5/26* (2013.01); *B32B 3/12* (2013.01); *B32B 5/022* (2013.01); *B32B 5/024* (2013.01); *B32B 5/026* (2013.01); *B32B 5/12* (2013.01); *B32B 5/147* (2013.01); *B32B 5/22* (2013.01); *B32B 7/12* (2013.01); *B32B 15/14* (2013.01); *B32B 27/12* (2013.01); *B32B 27/18* (2013.01); *B32B 27/28* (2013.01); *B32B 27/36* (2013.01); *B32B 27/38* (2013.01); *B32B 27/42* (2013.01); *B32B 37/20* (2013.01); *B32B 38/0008* (2013.01); *D06M 11/83* (2013.01); *B32B 2038/0092* (2013.01); *B32B 2255/02* (2013.01); *B32B 2255/205* (2013.01); *B32B 2255/28* (2013.01); *B32B 2260/021* (2013.01); *B32B 2260/046* (2013.01); *B32B 2262/02* (2013.01); *B32B 2262/0238* (2013.01); *B32B 2262/0246* (2013.01); *B32B 2262/0253* (2013.01);
(Continued)

(58) Field of Classification Search
CPC ......... B32B 15/14; B32B 27/02; B32B 27/04; B32B 27/12; B32B 2255/02; B32B 2260/021; B32B 15/26; Y10T 442/20; Y10T 442/2361; Y10T 442/646; Y10T 442/655; Y10T 442/656; Y10T 442/67155
USPC ...... 442/6, 52, 103, 229, 230, 231, 233, 307, 442/330, 377
See application file for complete search history.

(56) References Cited

U.S. PATENT DOCUMENTS

| | | |
|---|---|---|
| 2,397,415 A | 3/1946 | Ghez et al. |
| 3,598,637 A | 8/1971 | Stoll et al. |

(Continued)

FOREIGN PATENT DOCUMENTS

| | | |
|---|---|---|
| DE | 20213477 | 12/2002 |
| DE | 10300979 | 7/2004 |

(Continued)

OTHER PUBLICATIONS

PCT, International Search Report and Written Opinion, International Application No. PCT/US2010/027704; 15 pages (dated Aug. 5, 2010).

(Continued)

*Primary Examiner* — Andrew T Piziali
(74) *Attorney, Agent, or Firm* — Vivacqua Crane, PLLC

(57) ABSTRACT

Disclosed herein are laminates that include a layer containing a metal-coated fabric. The laminate may also include a layer or layers of an organic polymeric matrix composite. In accordance with certain embodiments, the matrix composite includes a thermosetting or thermoplastic resin matrix with parallel-oriented reinforcing fibers embedded therein, interposed between the metal-coated fabric layers.

20 Claims, 1 Drawing Sheet

(51) Int. Cl.

| | | |
|---|---|---|
| *B32B 27/36* | (2006.01) | |
| *B32B 5/22* | (2006.01) | |
| *B32B 27/28* | (2006.01) | |
| *B32B 5/02* | (2006.01) | |
| *B32B 15/14* | (2006.01) | |
| *B32B 27/42* | (2006.01) | |
| *B32B 5/14* | (2006.01) | |
| *B32B 27/12* | (2006.01) | |
| *B32B 37/20* | (2006.01) | |
| *B32B 27/18* | (2006.01) | |
| *B32B 27/38* | (2006.01) | |
| *B32B 7/12* | (2006.01) | |
| *B32B 5/12* | (2006.01) | |
| *B32B 38/00* | (2006.01) | |
| *B32B 3/12* | (2006.01) | |

(52) U.S. Cl.
CPC ............... *B32B 2262/0261* (2013.01); *B32B 2262/0269* (2013.01); *B32B 2262/0276* (2013.01); *B32B 2262/0292* (2013.01); *B32B 2262/10* (2013.01); *B32B 2262/101* (2013.01); *B32B 2262/105* (2013.01); *B32B 2262/106* (2013.01); *B32B 2262/14* (2013.01); *B32B 2305/076* (2013.01); *B32B 2305/18* (2013.01); *B32B 2307/306* (2013.01); *B32B 2307/50* (2013.01); *B32B 2307/718* (2013.01); *B32B 2309/02* (2013.01); *B32B 2309/105* (2013.01); *B32B 2605/18* (2013.01); *Y10T 156/10* (2015.01); *Y10T 428/249921* (2015.04); *Y10T 428/26* (2015.01); *Y10T 428/265* (2015.01)

(56) References Cited

U.S. PATENT DOCUMENTS

| | | | |
|---|---|---|---|
| 3,860,443 | A | 1/1975 | Lachman et al. |
| 3,969,563 | A | 7/1976 | Hollis, Sr. |
| 4,133,789 | A * | 1/1979 | Lakshmanan ............ C08K 5/54 156/322 |
| 4,223,075 | A | 9/1980 | Harrigan, Jr. et al. |
| 4,234,648 | A * | 11/1980 | Patz ........................ B29C 70/16 442/229 |
| 4,522,889 | A | 6/1985 | Ebneth et al. |
| 4,624,751 | A * | 11/1986 | Morin et al. ................ 205/138 |
| 4,816,124 | A | 3/1989 | Manabe et al. |
| 5,089,325 | A | 2/1992 | Covey |
| 5,160,771 | A | 11/1992 | Lambing et al. |
| 5,227,216 | A * | 7/1993 | Pettit ............................ 428/113 |
| 5,578,384 | A | 11/1996 | Kingston |
| 5,599,585 | A * | 2/1997 | Cohen ......................... 427/250 |
| 5,686,178 | A * | 11/1997 | Stevens et al. ............... 428/336 |
| 5,693,157 | A | 12/1997 | Kingston |
| 5,758,253 | A | 5/1998 | Teoh et al. |
| 5,866,272 | A | 2/1999 | Westre et al. |
| 6,039,832 | A | 3/2000 | McCarville |
| 6,114,050 | A | 9/2000 | Westre et al. |
| 6,194,081 | B1 | 2/2001 | Kingston |
| 6,320,118 | B1 | 11/2001 | Pridham et al. |
| 6,465,110 | B1 | 10/2002 | Boss et al. |
| 6,602,809 | B1 | 8/2003 | Cabrey |
| 6,764,754 | B1 | 7/2004 | Hunter et al. |
| 6,797,376 | B2 | 9/2004 | Anderson et al. |
| 7,115,323 | B2 | 10/2006 | Westre et al. |
| 2007/0000596 | A1 | 1/2007 | Westre et al. |
| 2007/0235390 | A1 | 10/2007 | Boyes et al. |
| 2008/0260998 | A1 | 10/2008 | Suzuki et al. |
| 2008/0289743 | A1 | 11/2008 | Tsotsis |

FOREIGN PATENT DOCUMENTS

| | | |
|---|---|---|
| EP | 1415799 | 5/2004 |
| WO | 2008/150716 | 12/2008 |

OTHER PUBLICATIONS

"High Perfromance mats and veil OPTIMAT® surface engineering composite," by Technical Fibre Products (no date).

Scheidbach, H. et al., "Influence of Titanium Coating on the Biocompatibility of a Heavyweight Polypropylene Mesh. An Animal Experimental Model," *European Surgical Research*, 36, 313-317 (2004) (no month).

Yan, J.Y.J. et al., "Titanium-coated Dacron® velour: A study of interfacial connective tissue formation," *Journal of Biomedical Materials Research*, vol. 23, pp. 171-189 (1989) (no month).

Department of Defense Handbook: Composite Materials Handbook, vol. 3. Polymer Matrix Composites Materials Usage, Design, and Analysis, Jun. 17, 2002 (excerpt of table of contents and Chapter 2, Section 2.4).

* cited by examiner

METAL-COATED FABRICS FOR FIBER-METAL LAMINATES

FIELD

The present invention relates to metal-coated fabrics and, more particularly, to metal-coated fabrics for fiber-metal laminates. In particular, the fiber-metal laminates can be used to impart strength to composite structures, such as aircraft skin panels of laminate structure.

BACKGROUND

Airframe manufacturers have found that skins of graphite, boron, or a blend of graphite and boron composite (collectively "polymeric composite") unidirectional tape can be strengthened by the introduction of titanium foil between laid-up plies of polymeric composite unidirectional tape. For example, U.S. Pat. No. 5,866,272 to Westre et al., incorporated herein by reference, is one of several patents teaching the placement of titanium foil between plies of polymeric composite unidirectional tape.

The resulting skin including a titanium foil makes up for a bearing deficiency of non-titanium-containing polymeric composite panels, which ordinarily will not bear loads or hold pins well. In addition, composite construction is typically one-third of the density of titanium. Titanium has a relatively low fatigue strength and relatively high crack-growth rates. Introducing titanium foil to the polymeric composite skins yields a resulting hybrid that exploits the strengths of polymeric composite and titanium construction. With the introduction of sufficient titanium foil, the resulting skin approaches and can surpass the strength properties of either material alone.

However, high-quality, thin sheets of titanium foil necessary for making titanium-carbon fiber-metal laminates, commonly known as TiGr (titanium graphite) laminates, are not readily available. Furthermore, Ti foils are non-porous and therefore are difficult or impossible to use in liquid-molding processes, such as resin-transfer molding (RTM), resin film infusion (RFI) and vacuum-assisted RTM (VARTM).

SUMMARY

The present invention is directed to laminate structures containing a metal-coated fabric as part of a fiber-metal laminate and methods for laying up fiber-metal laminate structures. In particular embodiments, the fiber-metal laminates can be used to impart strength to composite structures, such as aircraft skin panels of laminate structure.

The laminate structure may also include a fiber-reinforced polymer layer. In accordance with this aspect of the invention, the fiber-reinforced polymer may include a fiber selected from the group consisting of aramids, polyolefins, glass, carbon, boron, and ceramics.

In accordance with other aspects of the invention, the metal-coated fabric includes a metal selected from the group consisting of alloys of titanium, alloys of aluminum, and alloys of iron.

In accordance with still further aspects of the invention, the polymer in the fiber-reinforced polymer layer includes a thermosetting or a thermoplastic resin, or a polymer resin with qualities of both resins.

The laminates disclosed herein may include layups that include layers of metal-coated fabric with at least a one-ply layer of a polymeric matrix composite interposed between each metal-coated fabric layer, to produce a laminate. The layers of metal-coated fabric are typically about 0.001 to about 0.010 inches thick, more particularly from about 0.003 to about 0.010 inches thick. The layers of polymeric composite may be made up of one or more plies, with each layer typically being about 0.005 to about 0.03 inches thick.

In accordance with certain embodiments, the organic polymeric composite is formed from a prepreg in the form of a tape of continuous parallel reinforcing fibers coated with a resin to form a continuous strip. Thus, when the prepreg is laid down to form a composite ply, each composite ply includes a matrix of a resin reinforced with parallel fibers. In certain cases, these fibers make up from about 50 to about 70 volume percent of the resin and fibers when the fiber is carbon, and from about 40 to about 60 volume percent when the fiber is boron. When a mixture of carbon and boron fibers is used, total fiber volume may be in the range 75 to 80 volume percent. In accordance with various aspects of the present invention, the composite plies may be oriented to provide a specific fiber orientation in each layer of composite that is best suited for the particular service of the laminate.

The resin used for making the organic polymeric layers may be selected from those resins that are able to repeatedly withstand temperatures encountered during operation without undue softening or weakening that results in reduction of physical properties. Similarly, the reinforcing fibers may be selected from those fibers that are compatible with the resin, that provide an enhanced strength composite, and that are able to repeatedly withstand the temperatures encountered during operation without significant loss of physical properties.

The invention also provides laminate structures in the form of aircraft outer-skin panels, such as fuselage sections, wing sections, strakes, vertical and horizontal stabilizers, and the like. The laminates may be symmetrical and may include a core structure as a central layer sandwiched between outer layers of layups of composite plies and metal-coated fabric. The core structure may include, for example, titanium alloy honeycomb. The adjacent layers of metal-coated fabric or composite are tightly bonded to the honeycomb layers at interfaces between these layers and the honeycomb material. This structure provides a low-density (lightweight), high-strength, high-modulus, tailorable structure that has exceptional fatigue resistance and excellent thermo-mechanical endurance properties.

BRIEF DESCRIPTION OF THE DRAWINGS

Certain embodiments of the present invention are described in detail below with reference to the following drawings.

DETAILED DESCRIPTION

The laminates disclosed herein include a layer containing a metal-coated fabric. The laminate may also include a layer or layers of an organic polymeric matrix composite. In accordance with certain embodiments, the matrix composite includes a thermosetting or thermoplastic resin matrix with parallel-oriented reinforcing fibers embedded therein, interposed between the metal-coated fabric layers. The invention also provides aircraft skin panels, such as fuselage, wings, strakes, vertical and horizontal stabilizers, and the like, made of a sandwiched construction that includes two outer layups, that each include layers of metal-coated fabric and composite layers, with a layer of core material interposed between, and tightly bonded to, the outer layup layers to form a laminate structure. In certain embodiments, the outermost layer of the laminates is of metal-coated fabric to protect the underlying organic composite material from the environment and from exposure to chemical solvents. In certain embodiments, the core material is not used and the laminate skins are reinforced in another manner.

The present invention generally relates to laminate structures including a metal-coated fabric layer, and methods of laying up the same. Many specific details of certain embodiments of the invention are set forth in the following description and in FIGS. 1-3 to provide a thorough understanding of such embodiments. One skilled in the art, however, will understand that the present invention may have additional embodiments, or that the present invention may be practiced without several of the details described in the following description.

Figure 1:
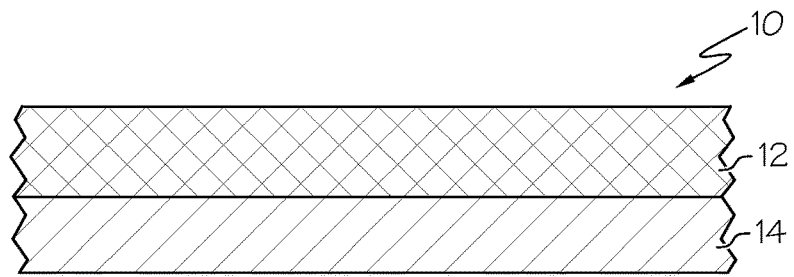
FIG. 1 is side elevational view of a cross-section of a laminate in accordance with an embodiment of the present invention.

FIG. 1 is a side-elevational view of a cross section through a metal-coated fabric reinforced composite laminate 10 according to one aspect of the present invention, comprising a metal-coated fabric 12 bonded directly to the surface of a fiber-reinforced composite layer 14.

Figure 2:
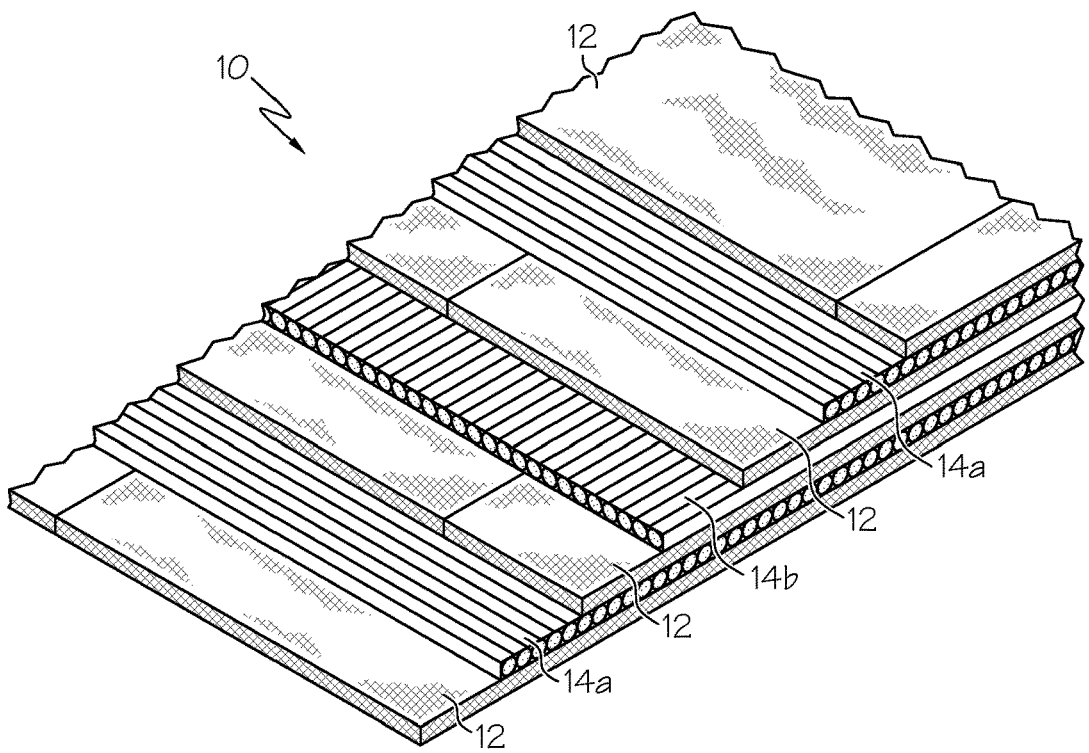
FIG. 2 is a schematic cross-sectional diagram showing the layers of an embodiment of a layup of a metal-coated fabric and composite that forms part of a laminate according to another embodiment of the present invention.

The laminates of the invention are better understood with reference to FIG. 2, a schematic diagram showing an exemplary embodiment of the laminates. Clearly, other layered arrangements are also contemplated, and some are shown below. The layup 10 in accordance with the illustrated embodiment has alternating layers of metal-coated fabric 12 with at least one ply of composite interposed between each successive metal-coated fabric layer. The fibers of the fiber-reinforced polymer 14 may be formed of a variety of known materials, including, for example, aramids, polyolefins, glass, carbon, boron, ceramics, or any other suitable fiber material, and may be disposed within a resin. Throughout this application, resin includes either a thermosetting or a thermoplastic resin, or a hybrid polymer resin with qualities of both resins. Similarly, the metal-coated fabric 12 may be formed of a variety of metallic materials, including, for example, copper, titanium, aluminum, alloys of titanium (e.g. Ti-6Al-4V, Ti-15V-3Cr-3Sn-3Al and Ti-15Mo-3Al-3Nb), alloys of aluminum, alloys of iron, or any other suitable metallic materials. Although not shown in FIG. 2, the adjacent layers of fiber-reinforced polymeric material 14 and metal-coated fabric layers 12 may be bonded with a suitable adhesive layer, including, for example, a thermosetting epoxy resin or other suitable adhesive.

A 90° cross-ply of organic composite 14a is interposed between the first two metal-coated fabric layers. A 0° ply 14b is interposed between the second and third metal-coated fabric layers. Finally, another cross-ply 14a is interposed between the third and fourth metal-coated fabric layers. In this particular layup, two-thirds of the fibers are arranged in a 90° cross-ply direction, while one-third of the fibers are arranged in a zero-degree direction. In certain embodiments, substantially all fibers are arranged in a zero-degree direction and in other embodiments some fibers are arranged at a 90° cross-ply direction and at +45° or −45° directions. In accordance with certain aspects of the invention, the fibers of a substantial majority of (more than about two-thirds), or all of, the plies of the laminate are oriented in a common direction.

Figure 3:
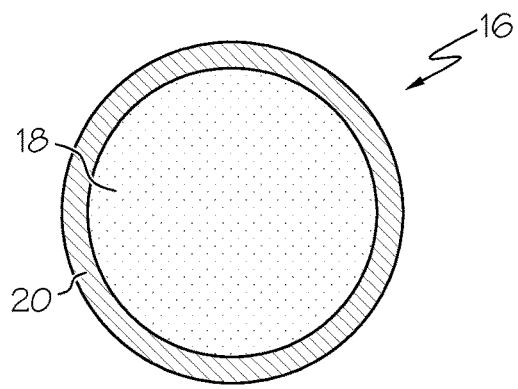
FIG. 3 is a transverse cross-sectional view of a metal-coated fiber from a metal-coated fabric in accordance with one embodiment of the present invention.

FIG. 3 is a transverse cross-sectional view of an isolated metal-coated fiber 16 from a metal-coated fabric 12. The metal-coated fiber 16 includes a polymeric fiber 18 coated with metal layer 20. More than one metal layer can be provided on the polymeric fiber 18 and each metal layer 20 can be of the same metal or of different metals.

In accordance with certain embodiments, the laminates of the invention are symmetrical with a central layer that is a lightweight core structure, such as titanium-alloy honeycomb material. Thus, the core layer is surrounded, or covered, on both sides by identical metallic foil-polymer composite layups forming outer coverings.

While the description that follows sometimes illustrates only the metal-coated fabric-polymer composite layups 10, it should be understood that the laminate structures may also include a central core structure layer covered on both sides by adhered identical metal-coated fabric-polymer composite layups to form a symmetrical structure of the invention.

The metal coatings on the fibers or fabric may substantially completely or partially coat the fibers or fabric. The metal coating may be applied to the individual fibers or to the formed fabric. The metal-coated fabric may comprise further metal or non-metal layers. In accordance with particular embodiments, the fabric may comprise more than one metal coating. Typically, the first metal coating may provide one function and any subsequent metal coatings may provide different functions. In accordance with other embodiments, a single type of metal is applied through multiple applications to provide the desired coating thickness.

The metals forming the coatings may have a purity greater than about 90%, greater than about 95% and preferably greater than about 99%. The first metal coating may have a thickness of about 0.5 µm to about 25 µm or about 1 µm to about 20 µm. In certain cases, the first metal coating may have a thickness of about 5 µm to about 10 µm. The thickness of the each metal coating may be substantially constant or vary with each application. Additional metal coatings of the same or different metals may be applied at similar thicknesses.

Typically, the metal-coated fabric may be in the form of a woven or non-woven fabric, felt or knit material. The fabric may comprise substantially perpendicularly oriented interlacing fibers in the weave. The fibers may be oriented substantially collinear and may have a width of about 0.010 to 0.050 mm. The weave in the fabric may therefore provide a substantially roughened surface at a microscopic level due to the undulating surface caused by the weave.

The fibers may be any suitable natural or synthetic fiber or a combination thereof. For example, the fibers may be formed from any suitable polymer such as polyamides (e.g., Nylon), polyesters, polyacrylates, fluoropolymers (e.g., PTFE or expanded PTFE), aramids (e.g. Kevlar), viscose (e.g. Rayon), or any combination thereof. Other suitable polymers include, but are not limited to, polyimides, polyamide-imides, polybutadienes, polyurethanes, polypropylenes, polyetherimides, polysulfones, polyethersulfones, polyphenylsulfones, polyphenylene sulfides, polyetherketones, polyetheretherketones, polyarylamides, polyketones, polyphthalamides, polyphenylene ethers, polybutylene terephthalates, polyethylene terephthalates and combinations thereof. Combinations may include simple polymer blends as well as copolymers. Fibers used in forming the fabric may also be non-polymeric. In accordance with certain embodiments, the fabric may be a blend of polymeric and non-polymeric materials.

The uncoated fibers may have a cross-sectional diameter of about 5 µm to 50 µm, about 10 µm to 35 µm or about 15 µm to 25 µm. The uncoated fabric typically weighs from about 1 to about 100 gsm, in certain cases less than about 1 gsm and in particularly useful cases the uncoated fabric weighs from about 2 to about 20 gsm.

According to another aspect of the present invention there is provided a method of forming a laminate comprising: providing a length of fabric; applying a metal coating onto the fabric to form a metal-coated fabric; and bonding the metal-coated fabric to another metal-coated fabric or other material to form a laminate.

In accordance with certain aspects of the present invention, the surfaces of the fabric are activated prior to depositing the metallic coating on the fibers, so that the surfaces will accept metal ions or molecules. This activating pretreatment can be accomplished by surface treatment with concentrated acids such as sulfuric, chlorosulfonic, or chromic acid, or by subjecting the material to a corona discharge. The activating pretreatment of acid-resistant, thermoplastic materials, such as polypropylene, is typically accomplished by acid treatment. In accordance with certain embodiments, the surfaces of the fabric may be coated with a base coat material that improves receptivity of the fabric to the metal coating. The base coating may be applied to the fabric surface by spraying, dipping, roll coating, flow coating, or any suitable process.

This acid pretreatment is believed to clean and roughen the surface of the strands to insure adhesion of the subsequently-applied metal coating to the surface of the fibrils. The metal is coated on the fabric through either covalent or non-covalent interactions including, but not limited to, electrostatic, ionic, adsorptive, absorptive, and chemically adhered coatings. In various embodiments, the coating is applied by chemical, physical and/or electrical deposition (adsorption or absorption), cladding, welding, grafting, fusing, sintering, or combinations thereof. In certain embodiments, vacuum deposition, a family of processes used to deposit layers atom-by-atom or molecule-by-molecule at sub-atmospheric pressure (vacuum) on a solid surface, may be used for the chemical, physical, or electrical deposition.

In an embodiment, the metal coating is applied in one or more process steps. In a further embodiment, the processes may use intermediate metallic and non-metallic compounds or agents to achieve the metal coating. In various embodiments, the coating is incorporated into, onto, and/or throughout the matrix of the fabric. The terms "coating" and "coated" refer to the covering of the fabric by metal and include incorporation of the metal either into, or onto, the fabric. Coating can be accomplished by any of the methods discussed herein. The term "cladding" refers to the formation of a layer of metal on the surface of the fabric. For the purposes of this disclosure, the terms "cladding" and "coating" are used interchangeably.

In accordance with certain embodiments, the metal coating may be applied using standard deposition techniques such as vacuum deposition. For example, any of the following techniques may be used: vacuum metallization; sputtering; plasma treatment; electroless deposition; and electrolytic plating. In accordance with other embodiments, powder coating may be utilized to apply the metal coating.

In accordance with some manifestations of the present invention, optional adhesives and silane bonding agents may be used to facilitate and enhance metal-to-composite bonding, and also core-to-metal-coated-fabric, and core-to-composite bonding.

Each layer of organic composite in the laminate of the invention is made up of at least one ply. Each layer of plies is preferably about 0.005 to about 0.03 inches thick ($125 \times 10^{-6}$ to $760 \times 10^{-6}$ m). Each ply of the reinforced fiber layer, when present, includes an organic polymeric resin, either thermosetting or thermoplastic, within which are embedded parallel reinforcing fibers. While the fibers within each ply of organic composite typically are parallel, these fibers may be at right angles, or indeed any other angle, to the fibers in another ply of organic composite in the laminate. Orientation of the fibers is selected based upon the expected forces to which the aircraft outer-shell component will be subjected.

In order to withstand the high temperatures to which the outer shell of an aircraft is exposed during supersonic flight, the resin should be "resistant to high temperatures". In other words, the resin should not unduly soften or cause delamination with resultant substantial and unacceptable reduction in physical and mechanical properties, when repeatedly exposed to the temperatures encountered during operation, for example temperatures of at least about 350° F. (about 175° C.) at about Mach 2.4 depending on flight speed. Exemplary of those resins that meet these requirements are polyaryletherketone; polyetheretherketone; polyimides; polyarylethersulfone; oxydiphthalic dianhydride 3,4' oxydianiline and functional derivatives of the latter, for instance, a derivative with 10% P-phenylenediamide and phthalic anhydride endcap monomers; or with 4-(3-aminophenoxy)-4-phenylethynyl benzophenone endcap monomers. Specific examples of particularly useful polymers include polyimide resins sold as AFR-PE-4 by Cytec Engineered Materials of Anaheim, Calif. and by Renegade Materials of Springboro, Ohio and phenylethynyl-containing polyimides sold as PETI-330 and PETI-365 by Ube Industries, Ltd. of Tokyo, Japan. Clearly, other resins meeting the condition of maintaining requisite strength at temperatures encountered during operating conditions of the laminate are also useful.

In one embodiment, the elongate parallel fibers used as a reinforcement in the organic polymeric matrix layers are selected from carbon and boron fibers. In certain embodiments, as will be explained below, it is preferred to use a mixture of carbon and boron fibers as reinforcement in a single ply. The preferred carbon fibers are those sold as carbon of "intermediate or high strength" with moduli of 35-50 Msi and tensile elongation failure of 1.5% or greater. Typically these fibers are produced from the PAN (polyacrylonitrile) precursor family of fibers. The preferred boron fibers are the smallest boron fibers (at least about 4-7 mil) with highest tensile elongation. Particularly useful boron/carbon fiber mixture prepregs are sold under the trade name HYBOR (by Textron Specialty Materials of Lowell, Mass.). This fiber combination permits a higher fiber-volume percentage in the plies and utilizes the high compressive properties of boron with the high tensile properties of carbon. Each type of fiber is best suited for particular applications, as discussed below.

Each of the principal components of the structure constructed in accordance with certain aspects of the present invention, i.e., the metal-coated fabric, the polymer composite material, and the core structure, are generally preconstructed and arranged for use in conjunction with the present invention. The composite material generally comprises a high-temperature polymeric resin containing oriented, continuous carbon, or other, strengthening fibers. The composite material is usually supplied in the form of an elongate ribbon or tape wound upon a spool. The material is then unwound from the spool and applied to the receiving surface. Similarly, the core, if any, is premanufactured and supplied for use in conjunction with the present invention.

The laminates may be made by any of a number of methods. However, in the case of thermoplastic composites, the laminates typically are prepared by successively laying down long, continuous strips of pre-impregnated thermoplastic-resin fibrous tapes ("prepregs"), by means of a thermoplastic application head, directly onto the metal-coated fabric. By laying down strips of tape side-by-side while consolidating these through the application of heat and pressure, a continuous ply of composite with parallel-oriented fibers is produced. Thereafter, another ply or plies of composite may be laid down on top of the first ply, depending upon the properties needed of the laminate. The ply or plies make up a layer of composite. Then, a layer of metal-coated fabric is applied over the consolidated composite layer and is bonded, for example heat-fused, onto the composite. Thereafter, a next layer of organic composite is formed on top of the metal-coated fabric by laying down a ply or plies, as described above. Finally, after laying down the predetermined number of layers of metal-coated fabric and organic polymeric matrix, an outer layer of metal-coated fabric is applied. The outer layers of metal-coated fabric protect the underlying organic composite of the laminates from the environment and attack by fluids.

Another means of laying down fiber-reinforced thermoplastic materials is the use of "intimate blends" that comprise mixtures of structural fibers and thermoplastic filaments, which may be handled like a dry fabric and which require heat and pressure to melt and consolidate. Similarly, comingled thermoplastic filaments and structural fibers may also be made into dry prepregs and processes in a fashion comparable to that used for intimate blends. Other than the laying down of the thermoplastic prepreg, processing is identical to that described above.

Alternative methods of fabrication, some discussed in more detail below, are also useful. For example, all layers of the laminate may be stacked in an autoclave or press, without prefusion of layers, and may then be fused under applied heat and pressure into a unitary laminate. The laminate may be prepared using liquid-molding processes such as resin-transfer molding (RTM), resin film infusion (RFI), and vacuum-assisted RTM (VARTM), etc.

While the above description has focused on the use of the laminates of the invention in aircraft, specifically supersonic aircraft, it is clear that the laminates are useful in a variety of other applications that require a lightweight, high strength-to-weight ratio material that may have some of the other enhanced properties discussed above.

While particular embodiments of the invention have been illustrated and described, as noted above, many changes can be made without departing from the spirit and scope of the invention. Accordingly, the scope of the invention is not limited by the disclosure of particular embodiments. Instead, the invention should be determined entirely by reference to the claims that follow.

What is claimed is:

1. A composite structure comprising:
   a laminate, wherein the laminate comprises:
      a first non-reinforced layer comprising a polymeric fiber that is coated with a metal coating to create a metal-coated fabric;
      a second fiber-reinforced layer of polymeric composite comprising a polymeric resin and a first set of parallel reinforcing fibers embedded in the polymeric resin, wherein the reinforcing fibers are not metal-coated; and
      a third fiber-reinforced layer of polymeric composite comprising the polymeric resin and a second set of parallel reinforcing fibers embedded in the polymeric resin that are not metal-coated, wherein the first non-reinforced layer is bonded to the second fiber-reinforced layer and the third fiber-reinforced layer by an adhesive.

2. The composite structure of claim 1, wherein the material of the reinforcing fibers is selected from the group consisting of aramids, polyolefins, glass, carbon, boron and ceramics.

3. The composite structure of claim 1, wherein the metal is selected from the group consisting of titanium, aluminum, alloys of titanium, alloys of aluminum, and alloys of iron.

4. The composite structure of claim 3, wherein the metal comprises titanium or an alloy of titanium.

5. The composite structure of claim 1, wherein the polymeric resin is selected from the group consisting of epoxies, bismaleimides, cyanate esters, phenolics, polybenzoxazoles, polyaryletherketones, polyetheretherketones, polyimides, polyarylethersulfones, oxydiphthalic dianhydride 3, 4' oxydianiline, and functional derivatives thereof.

6. The composite structure of claim 1, wherein the thickness of the metal coating is from about 1 μm to about 25 μm.

7. The composite structure of claim 1, wherein the polymeric fabric comprises a first metal coating of a first metal and a second metal coating of a second metal.

8. An aircraft skin panel comprising the composite structure of claim 1.

9. The composite structure of claim 1, wherein the reinforcing fibers of the layer of polymeric composite are selected from the group consisting of carbon, boron, and combinations thereof.

10. The composite structure of claim 1, wherein the polymeric fabric, without the metal coating, has a weight of about 2 to about 20 gsm.

11. The composite structure of claim 1, wherein the polymeric fabric, without the metal coating, has a weight of less than 1 gsm.

12. The composite structure of claim 1, further comprising a core layer having at least one layer of the metal-coated fabric and at least one layer of polymeric composite on both sides thereof in a symmetrical arrangement of layers.

13. The composite structure of claim 1, wherein the reinforcing fibers of the second fiber-reinforced layer of polymeric composite and the third fiber-reinforced layer of polymeric composite include a cross-sectional diameter of about 5 μm to about 50 μm.

14. The composite structure of claim 1, wherein the metal coating completely covers the polymeric fiber of the metal-coated fabric.

15. The composite structure of claim 1, wherein the metal coating partially covers the polymeric fiber of the metal-coated fabric.

16. A composite structure, the structure comprising;
    a laminate, the laminate comprising:
       a layup comprising laminated layers of metal-coated fabric layers, wherein the metal-coated fabric layers are non-reinforced and constructed of a polymeric fiber that is coated with a metal coating; and
       an organic polymeric composite layer between adjacent metal-coated fabric layers, the composite layer being a reinforced layer comprising at least two plies, wherein the at least two plies comprise a polymeric matrix having commonly aligned reinforcing fibers embedded therein, wherein the reinforcing fibers are not metal, and wherein at least one of the metal-coated fabric layers are bonded to either the first ply or the second ply by an adhesive.

17. The composite structure of claim 16, wherein the layup further comprises an outer layer of metal-coated fabric, the outer layer bonded to an adjacent composite ply.

18. The composite structure of claim 16, wherein the polymeric matrix is selected from the group consisting of epoxies, bismaleimides, cyanate esters, phenolics, polybenzoxazoles, polyaryletherketones, polyetheretherketones, polyimides, polyarylethersulfones, oxydiphthalic dianhydride 3, 4' oxydianiline, and functional derivatives thereof.

19. The composite structure of claim 16, wherein the reinforcing fibers are selected from the group consisting of graphite and boron fibers.

20. The composite structure of claim 16, wherein the metal coating completely covers the polymeric fiber of the metal-coated fabric.

\* \* \* \* \*